March 30, 1948.   MARIE-MARGUERITE DUFAUX   2,438,657
BICYCLE HANDLE
Filed Aug. 24, 1944

Inventor
M. M. Dufaux
By Glascock Downing & Seebold
Attys

Patented Mar. 30, 1948

2,438,657

UNITED STATES PATENT OFFICE 2,438,657

BICYCLE HANDLE

Marie-Marguerite Dufaux, Geneva, Switzerland

Application August 24, 1944, Serial No. 550,950
In Switzerland October 7, 1943

1 Claim. (Cl. 74—551.5)

The present invention relates to bicycle handles.

It is an object of the invention to provide an improved bicycle handle which permits while running to change the height of the grips and to secure the said grips at the chosen height.

Other objects will appear from the following description, reference being had to the accompanying drawings in which.

Figure 1:
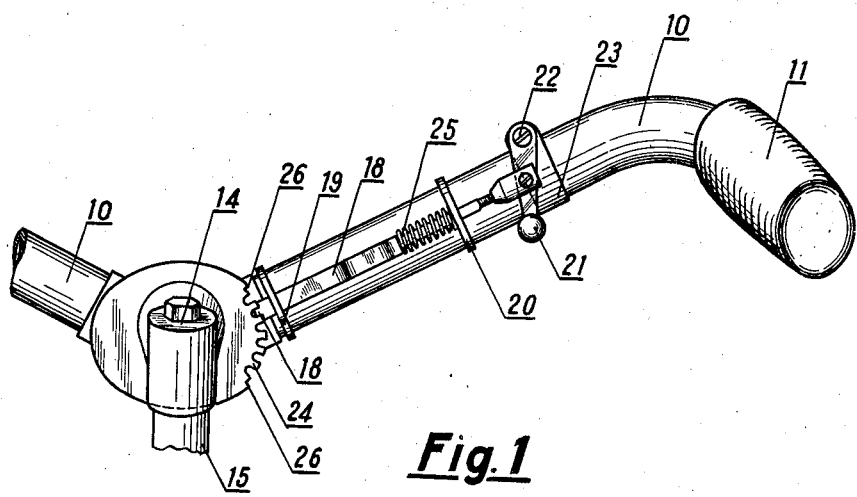
Figure 1 is a rear elevation of a first embodiment of the invention.
Figure 2:
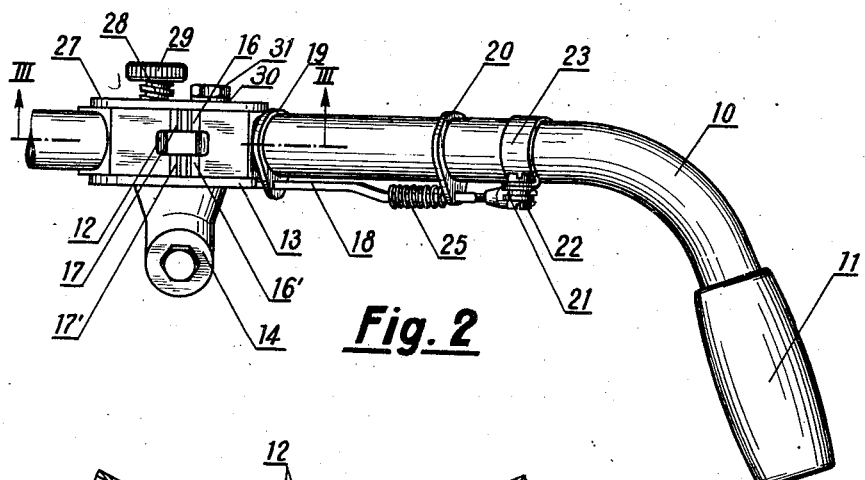
Figure 2 is a plan view thereof.
Figure 3:
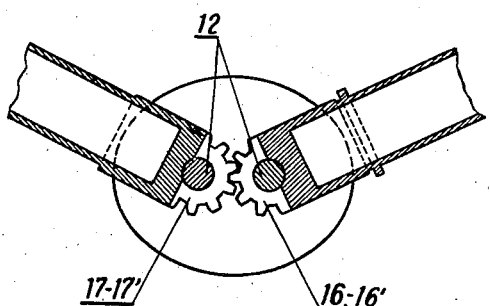
Figure 3 is a longitudinal section along the line III—III of Figure 2.

The adjustable bicycle handle shown in the Figs. 1 to 3 comprises two arms 10 provided with grips 11; each arm 10 is separately articulated about a pivot 12 dependent on a flange or plate 13 provided on the nipple 14 of the steering column 15.

The articulated ends of the arms 10 are each provided respectively with two toothed segments 16, 16', 17, 17' meshing with each other so that the arms are made dependent in rotation on each other. A bar 18, guided by clips 19, 20 brazed to one of the arms 10, is hinge-connected by its outer extremity to a hand lever 21 journalled about the clamping screw 22 of a clip 23 clamped on the arm 10 near the grip 11. The inner end of the bar 18 is provided with a pawl 18' adapted to co-operate with the teeth 24 of a toothed segment provided on the flange or plate 13 made integral with the nipple 14. A coil spring 25 meeting the clip 20 tends to urge the bar 18 in locking position. Furthermore, the angular displacements of the arms 10 are limited in both directions by stops as by shoulders 26 of the flange or plate 13 against which the pawl 18' of the bar 18 comes to thrust. A braking device of the angular displacements of the arms 10 is also provided for: a plate 27 through which pass the threaded ends of the pivots 12 is resiliently pressed by springs 28, 30 and nuts 29, 31 screwed on the pivots 12 against the flat sides of the hinged ends of the arms 10. The spring 30 is constituted by a spring washer and the spring 28 by a coil spring of square cross-section which permits of a certain adjustment of the pressure on the plate 27.

The plates 13 and 27 constitute the side walls of a casing which may be closed upwardly and downwardly by removable or fixed covers.

The articulated handle according to the invention permits the cyclist to adjust at will the height of the grips while running according to the profile of the road, the required strain, the direction of the wind, etc.

What I claim is:

In a bicycle handle construction, a toothed flange carried in a nearly vertical plane by the nipple of the steering column, two pivots on said flange, a pair of handle arms pivotally mounted on said pivots and having their inner ends in intermeshing engagement so that they may be simultaneously adjusted to the desired angular position, a spring urged and manually operable pawl slidingly mounted along one of said handle arms and adapted to engage with its inner end said toothed flange for locking said handle arms in the desired angular position, a plate movably engaged with the projecting ends of said pivots, springs arranged about the projecting ends of said pivots and pressing said plate against the inner ends of the handle arms for braking the angular movements of said arms when released from the locking pawl, whereby the handle arms may be adjusted to the desired height while running, and adjusting elements threaded on the projecting ends of the pivots for adjusting the tension of the braking springs.

MARIE-MARGUERITE DUFAUX.

REFERENCES CITED

The following references are of record in the file of this patent:

UNITED STATES PATENTS

| Number | Name | Date |
|---|---|---|
| 1,551,823 | Guy | Sept. 1, 1925 |
| 603,177 | Crocker | Apr. 26, 1898 |

FOREIGN PATENTS

| Number | Country | Date |
|---|---|---|
| 374,172 | France | Jan. 26, 1909 |
| (Addition to No. 10,048) | | |
| 587,015 | France | Jan. 12, 1925 |
| 669,810 | France | Aug. 10, 1929 |
| 395,546 | France | Oct. 21, 1908 |
| 22,177 | Great Britain | Oct. 21, 1898 |